UNITED STATES PATENT OFFICE.

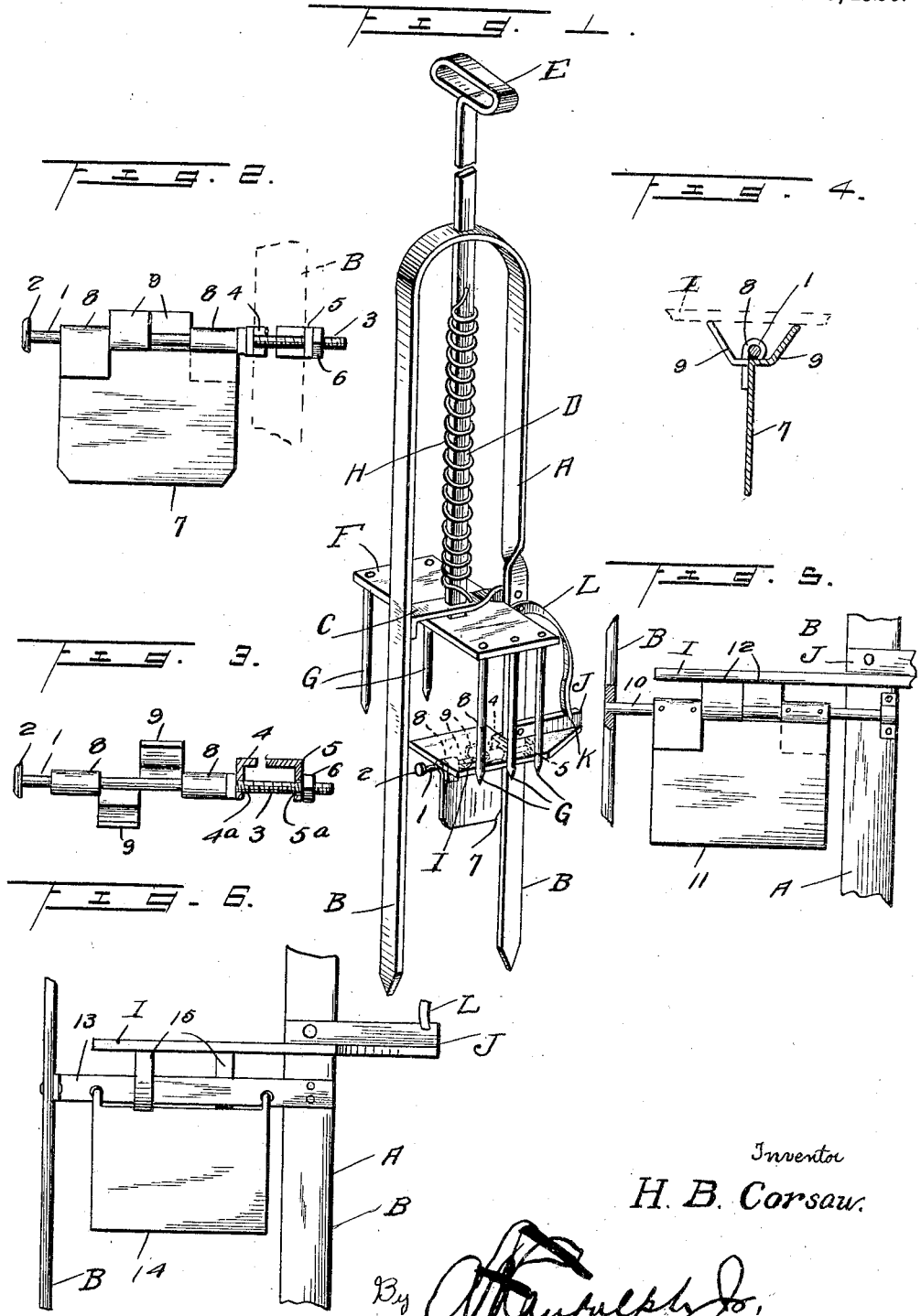

HARRY B. CORSAW, OF SPRINGFIELD, OREGON.

TRAP.

1,330,622.  Specification of Letters Patent.  Patented Feb. 10, 1920.

Application filed February 17, 1919. Serial No. 277,459.

*To all whom it may concern:*

Be it known that I, HARRY B. CORSAW, a citizen of the United States, residing at Springfield, in the county of Lane and State of Oregon, have invented certain new and useful Improvements in Traps; and I do hereby declare the following to be a full, clear, and exact description of the invention, such as will enable others skilled in the art to which it appertains to make and use the same.

The invention relates to an attachment for the Reddick type of mole trap to adapt it for use in trapping gophers, ground squirrels and the like, and has for its object the provision of means for springing the trap consisting of an obstacle placed in the path of the animal and so positioned and constructed as to trip the pan provided in the trap aforesaid to release its impaling member.

The invention will be found more particularly described hereinafter and illustrated in the accompanying drawings in which—

Figure 1 is a view in perspective of a mole trap showing my attachment mounted thereon;

Fig. 2, a side elevation of the attachment detached from the trap;

Fig. 3, a top edge view;

Fig. 4, a cross section;

Fig. 5, a fragmental view of the mole trap showing a modified form of attachment; and Fig. 6, a similar view showing still another form of the attachment.

In the drawings similar reference characters will be used to designate corresponding parts throughout the several views.

In Fig. 1 is shown a mole trap of the impaling type and commonly known as the Reddick mole trap to which my attachment is applied. Said mole trap consists of an inverted U-shaped frame A having its legs B sharpened at their ends to admit of easily pushing the frame into the earth. Intermediate of the ends of the frame A is a cross-bar C secured to legs B. D indicates a rod slidably mounted in openings in bend of frame A and in cross-bar C and having a suitable handle E on its upper end. F indicates a plate secured to the lower end of rod D and having a plurality of impaling members or spikes G secured to its ends. H indicates a contractile coil spring inclosing rod D and having its upper terminal secured to said rod D while its lower terminal is secured to cross-bar C, it being understood that said spring H normally tends to pull rod D downwardly. I indicates a trip plate pivotally secured to one leg B through upwardly extending flange J, and K indicates a notch in said flange that is adapted to receive one end of trigger L, pivotally secured to leg B, when the trap is set the other end of said trigger being seated under plate F to hold the trap in set position.

My improvement consists, as shown in Fig. 1, of attaching the device, shown in detail in Figs. 2, 3, and 4, to one of the legs B and consists of a rod 1 provided with a head 2 on one end while the other end is threaded as shown at 3. 4 indicates an L-shaped clamping member and having a threaded opening 4ª to permit its adjustment on threaded end 3 of rod 1, and 5 indicates another L-shaped member having an opening 5ª therein larger in diameter than rod 1 to permit said member to slide readily over threads 3.

The attachment is secured to one of the legs B by clamping members 4 and 5, as shown in Fig. 1, said clamping member 5 being held in engagement with the leg by nut 6. A plate 7 is pivotally suspended from rod 1 by tubes 8 formed from strips cut from said plate while other strips 9 are bent upwardly and outwardly to engage the underside of plate I.

When in position as shown in Fig. 1, it will be readily understood that should plate 7 be swung in either direction, one of the arms 9 will engage plate I and push it up and thus release trigger L and plate F will be pulled down by spring H and the animal moving plate 7 will be impaled on one or more of spikes G.

In Fig. 5 is shown a modified form of attachment in which a shaft 10 is journaled in legs B and has plate 11 secured thereto or formed integral therewith and having arms 12 secured to the plate to trip plate I.

In Fig. 6 another modification is shown employing a bar 13 secured to legs B with plate 14 pivotally secured thereto and having arms 15 to trip plate I.

It will be understood that the relative sizes of the various parts may be altered as desired for the most satisfactory operation of my invention and furthermore that other minor changes may be made as found necessary without altering the spirit and scope of the invention.

Having thus described the invention what is claimed is:—

1. In combination with a trap comprising a U-shaped frame, an impaling member movably mounted on said frame, and a trip plate pivotally mounted on the frame and controlling the movement of said impaling member, a rod removably and replaceably secured to one of the legs of said frame, and means mounted on said rod and engaging said trip plate to actuate it.

2. In combination with a trap comprising a U-shaped frame, an impaling member movably mounted on said frame, and a trip plate pivotally mounted on the frame and controlling the movement of said impaling member, a rod removably and replaceably secured to one of the legs of said frame and extending below said trip plate, a plate pivotally secured to said rod, and arms on said plate engaging said trip plate.

3. In combination with a trap comprising a U-shaped frame, an impaling member movably mounted on said frame, and a trip plate pivotally mounted on the frame and controlling the movement of said impaling member, a rod located below said trip plate, L-shaped clamping members slidably mounted on said rod and adapted to engage one of the legs of said frame, and means mounted on said rod and engaging said trip plate to actuate it.

In testimony whereof I affix my signature in presence of two witnesses.

HARRY B. CORSAW.

Witnesses:
O. S. PENNEY,
CHAS. L. SCOTT.